US011324199B2

(12) United States Patent
Thiem et al.

(10) Patent No.: US 11,324,199 B2
(45) Date of Patent: May 10, 2022

(54) STABILIZED EQUINE ANKLE BRACE

(71) Applicants: Meghan Thiem, Tucson, AZ (US); Gerald D. Detty, Tucson, AZ (US)

(72) Inventors: Meghan Thiem, Tucson, AZ (US); Gerald D. Detty, Tucson, AZ (US)

(*) Notice: Subject to any disclaimer, the term of this patent is extended or adjusted under 35 U.S.C. 154(b) by 340 days.

(21) Appl. No.: 15/974,830

(22) Filed: May 9, 2018

(65) Prior Publication Data

US 2019/0343075 A1 Nov. 14, 2019

(51) Int. Cl.
*A01K 13/00* (2006.01)
*A61D 9/00* (2006.01)

(52) U.S. Cl.
CPC .............. *A01K 13/007* (2013.01); *A61D 9/00* (2013.01)

(58) Field of Classification Search
CPC .... A01K 13/007; A01K 13/006; A01K 13/00; A61D 9/00; A61F 13/065; A61F 5/0111; A61F 7/02; A61F 5/00; A61F 5/01; A41D 13/06; A41D 17/00; A41D 17/005; A41D 17/02; A43B 7/20; A63B 2071/1275; A63B 2071/1266
USPC ........... 602/23, 27, 75, 25; 54/82; 2/22, 911; 119/850
See application file for complete search history.

(56) References Cited

U.S. PATENT DOCUMENTS

| 2,512,925 | A | * | 6/1950 | Eggeman | A01K 13/007 |
| | | | | | 54/82 |
| 2,937,487 | A | | 5/1960 | Dever | |
| 3,193,984 | A | | 7/1965 | Schubert | |
| 4,099,269 | A | | 7/1978 | Porner | |
| 4,538,602 | A | | 9/1985 | Shapiro | |
| 5,115,627 | A | | 5/1992 | Scott | |
| 5,152,285 | A | | 10/1992 | Gnegy | |
| 5,363,632 | A | | 11/1994 | Armato | |
| 5,393,303 | A | * | 2/1995 | Shiono | A61F 5/0111 |
| | | | | | 602/23 |
| 5,579,627 | A | | 12/1996 | Vogt | |
| 5,871,458 | A | * | 2/1999 | Detty | A01K 13/007 |
| | | | | | 607/108 |
| 5,910,126 | A | | 6/1999 | Wilson et al. | |
| 2004/0031246 | A1 | * | 2/2004 | Springs | A01K 13/007 |
| | | | | | 54/82 |
| 2017/0027132 | A1 | * | 2/2017 | Coder | A01K 13/007 |

\* cited by examiner

*Primary Examiner* — Alireza Nia
*Assistant Examiner* — Robin Han
(74) *Attorney, Agent, or Firm* — Caesar Rivise, PC

(57) ABSTRACT

An equine ankle brace including a panel of a resilient thermally insulating, heat retaining material, having a cup-shaped bottom portion for enabling the panel to be wrapped around the horse's ankle to readily conform to it. The panel has an inner surface and an outer surface, a pair of front marginal edges including releasably securable fastening straps for securing the brace in place. A stabilizing, e.g., leather, patch is fixedly secured to the panel at the location of the cup-shaped bottom portion. A fetlock support strap is fixedly secured to the stabilizing patch and includes respective portions configured to be pulled into an X-shaped overlapping relationship over the front of the brace for releasable securement to portions of the outer surface of the brace.

13 Claims, 3 Drawing Sheets

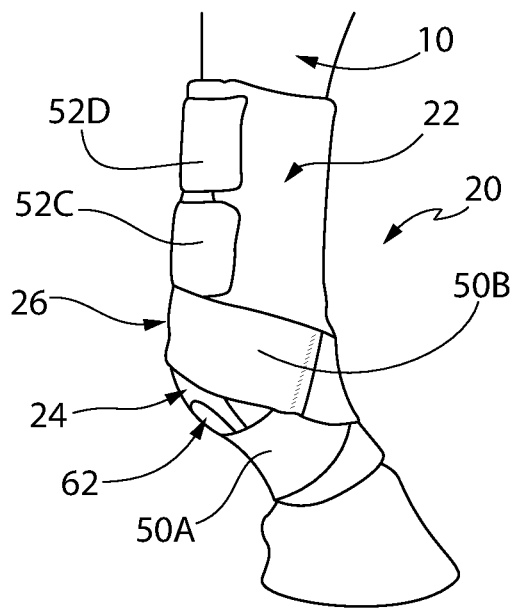
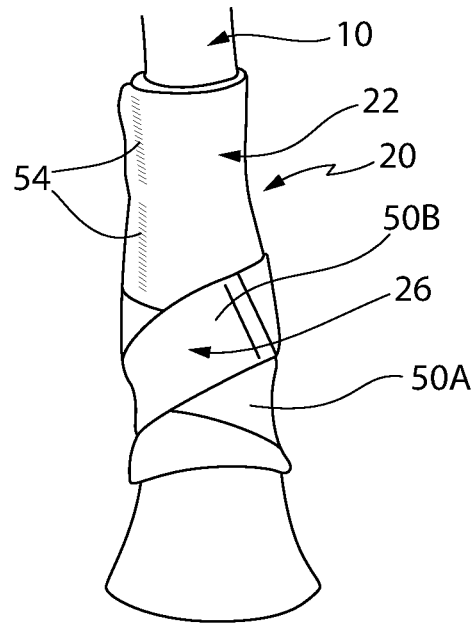
FIG. 1A          FIG. 1B
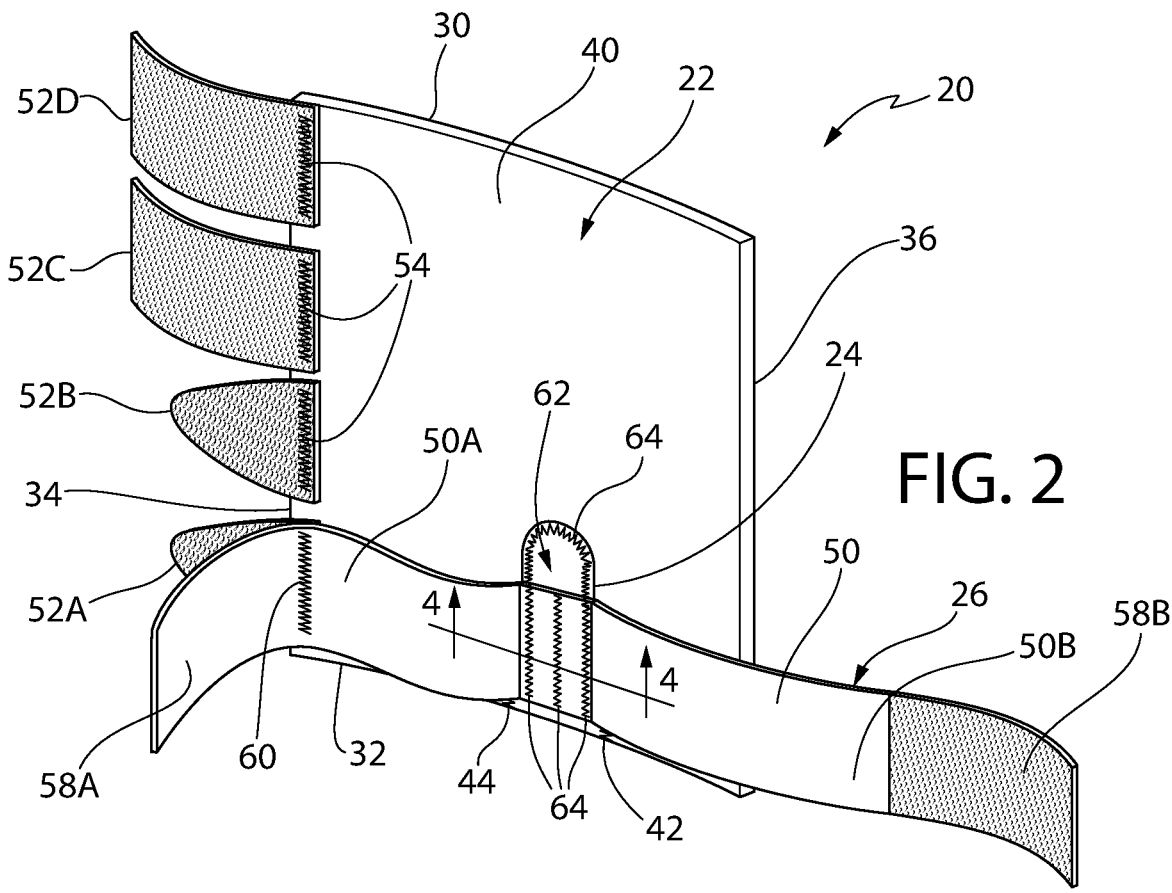
FIG. 2

STABILIZED EQUINE ANKLE BRACE

FIELD OF THE INVENTION

This invention relates generally to ankle braces and more particularly to ankle braces for horses.

BACKGROUND OF THE INVENTION

Horses, particularly those involved in athletic activities, such as running, jumping, etc., frequently suffer from a variety of ailments to their ankles and the muscles and tendons associated therewith. These ailments can vary from simple tendonitis to severe joint degeneration.

Several United States Letters Patents have been issued disclosing various braces for use on the ankles of horses to provide bracing and/or other beneficial effects to the ankle and associated anatomical structures. Those patents are: U.S. Pat. No. 2,512,925 (Eggeman); U.S. Pat. No. 2,937,487 (Dever); U.S. Pat. No. 3,193,984 (Schubert); U.S. Pat. No. 4,099,269 (Porner); U.S. Pat. No. 4,538,602 (Shapiro); U.S. Pat. No. 5,115,627 (Scott); U.S. Pat. No. 5,152,285 (Gnegy); U.S. Pat. No. 5,363,632 (Armato); U.S. Pat. No. 5,579,627 (Vogt); and U.S. Pat. No. 5,910,126 (Wilson et al.) While those prior art equine ankle braces may be generally suitable for their intended purposes, they never the less leave something to be desired from one or more of the standpoints of adaptability for various applications, effectiveness, ease of mounting and dismounting, ease of use, ease of adjustment, resistance to accidental disconnection or loosening, and customization of the brace for a particular therapy desired.

U.S. Pat. No. 5,871,458 (Detty) discloses an equine ankle brace system which overcomes many of the disadvantages of the above identified prior art. Nevertheless the ankle brace system of U.S. Pat. No. 5,871,458 still leaves something to be desired from the standpoints of stability, ease of fitting, and resistance to wear. Accordingly, a need exists for an equine ankle brace which overcomes various disadvantages of the prior art. The subject invention addresses that need.

BRIEF SUMMARY OF THE INVENTION

One aspect of this invention is an equine ankle brace configured to be wrapped about the ankle of a horse. The brace comprises a panel, a flexible stabilizing patch and a releasably securable fetlock support strap. The panel is formed of a resilient thermally insulating, heat retaining material having an inner surface, an outer surface, a first longitudinal edge, a second longitudinal edge, and a cup-shaped bottom portion located between the first and second longitudinal edges. The panel is configured to be wrapped into an operative state around and closely conforming to the horse's ankle and contiguous portions of the horse's lower leg such that the portion of the horse's lower leg at the rear of the fetlock joint is located within the cup-shaped bottom portion. The outer surface of the panel comprises a first releasably securable component of a fastening system. The flexible stabilizing patch is fixedly secured to the outer surface of the panel at the cup-shaped bottom portion. The stabilizing patch is confined to the portion of the horse's lower leg at the rear of the fetlock joint when the panel is in the operative state and provides an area of controlled stretch of the resilient thermally insulating, heat retaining material of the panel to provide additional stability at the flex point of the fetlock joint. The releasably securable fetlock support strap is fixedly secured to the stabilizing patch and to the panel. The releasably securable fetlock support strap comprises a pair of free end portions projecting outward from opposite sides of the stabilizing patch. Each of the free end portions includes a second releasably securable component of the fastener system. The free end portions of the releasably securable fetlock support strap are configured to be pulled into engagement with respective portions of the panel to releasably secure the second releasably securable component of the fastening system of the free end portions of the releasably securable fetlock support strap to the first releasably securable component of the fastening system of the panel and with portions of the releasably securable fetlock support strap adjacent the free end portions of the releasably securable fetlock support strap overlapping each other in a generally X-shaped configuration when in the operative state.

In accordance with one preferred aspect of this invention the longitudinal edges are configured to be brought proximate each other when the panel is wrapped about the horse's ankle. The ankle brace additionally comprises plural fastening straps fixedly secured to the panel adjacent one of the longitudinal edges. Each of the plural fastening straps includes a free end including a second releasably securable component of the fastener system configured to be pulled into engagement with other respective portions of the panel to releasably secure the second releasably securable component of the fastening system of the plural fastening straps to the first releasably securable component of the fastening system of the panel.

In accordance with another preferred aspect of this invention the thermally insulating, heat retaining material comprises neoprene rubber, the first releasably securable component of the fastening system comprises a plush or multi-loop material, and the second releasably securable component of the fastening system comprises a multi-hook loop material.

In accordance with another preferred aspect of this invention the flexible stabilizing patch comprises a leather-like material.

In accordance with another preferred aspect of this invention the leather-like material is leather.

In accordance with another preferred aspect of this invention the flexible stabilizing patch is sewn onto said outer surface of the panel.

In accordance with another preferred aspect of this invention the releasably securable fetlock support strap is sewn onto said stabilizing patch.

DESCRIPTION OF THE DRAWING

The invention will be described in conjunction with the following drawings in which like reference numerals designate like elements and wherein:

FIG. 1A is a side elevational view of one exemplary embodiment of an equine ankle brace constructed in accordance with this invention, with the ankle brace being shown in its operative position or state mounted on the lower leg and ankle of a horse;

FIG. 1B is a front elevational view of the equine ankle brace of FIG. 1A shown in its operative position or state mounted on the lower leg and ankle of a horse;

FIG. 2 is an isometric view of the exemplary equine ankle brace of FIGS. 1A and 1B, with the view being taken from an angle to show the outer surface features of that ankle brace;

DETAILED DESCRIPTION OF ONE PREFERRED EMBODIMENT OF THE INVENTION

Figure 3:
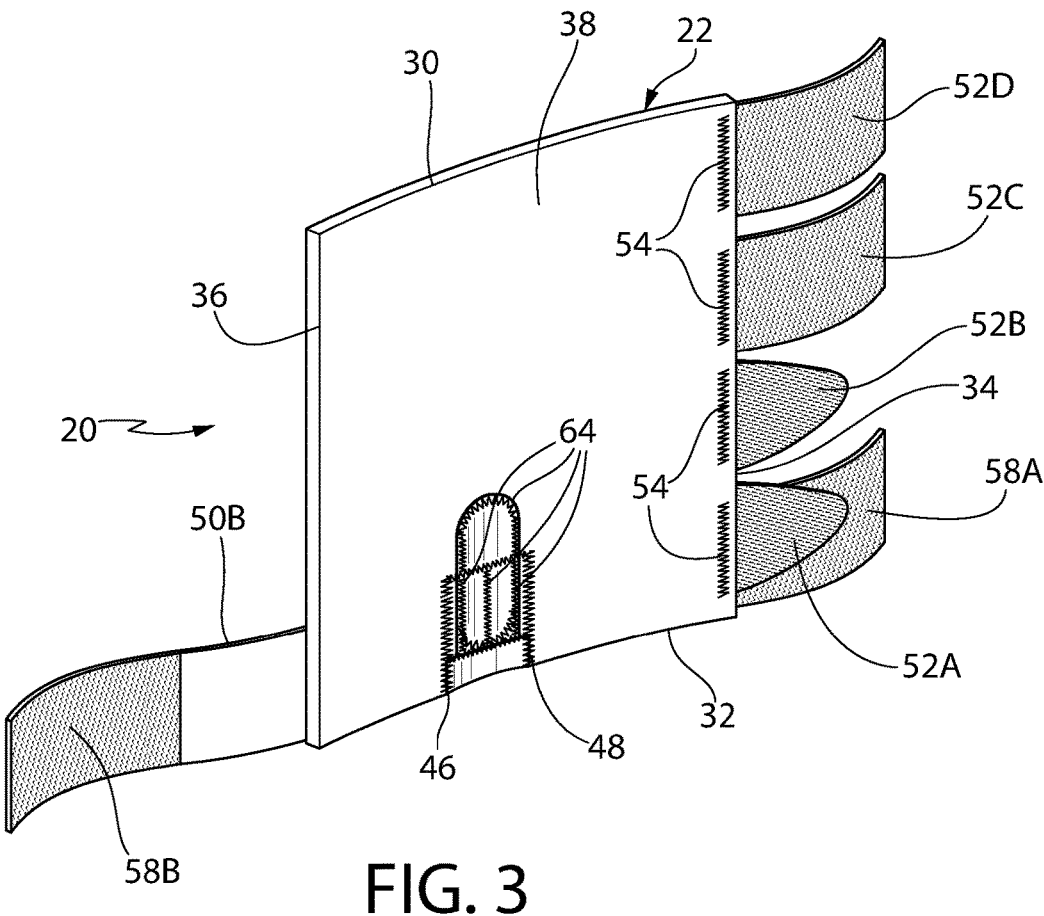
FIG. 3 is an isometric view of the exemplary equine ankle brace of FIGS. 1A and 1B, with the view being taken from another angle to show the inner surface features of that ankle brace.

Referring now to the various figures of the drawing wherein like reference characters refer to like parts, there is shown in FIG. 1 one exemplary equine ankle brace 20 constructed in accordance with this invention for mounting on the lower leg 10 and ankle of a horse. The equine ankle brace 20 basically comprises a support panel 22 of neoprene rubber (or some other good thermally insulative, stretchable material) configured to be wrapped around the horse's lower leg and its ankle. As will be appreciated from the discussion to follow, the brace 20 is constructed so as to be used on the ankles of only one side of the horse. Thus, in accordance with this invention there is a "right" side brace for use on either one of the horse's right side ankles, and a mirror image "left" side brace for use on either one of the horse's left side ankles. The brace 20 is arranged so that it can be mounted quickly and easily on the horse's lower leg and ankle and in good close conformance therewith. Thus, as will be described later, the brace 20 includes a cup-shaped portion 24 (FIGS. 1A, 2, 3 and 5A), which in cooperation with the stretchable nature of the neoprene enables the brace to closely conform to the ankle and adjacent equine anatomy when it is wrapped about the lower leg and ankle and secured in place. In particular, the cup-shaped portion 24 defines a pocket or recess for accommodating the rear or posterior portion of the horse's fetlock joint. The securement of the brace on the horse's lower leg and ankle is achieved through the use of readily adjustable securement means 26, also to be described later. Thus, when the brace 20 is in place in its "operative" position or state (to be described later) the brace provides excellent support for the horse's ankle, irrespective variations in the size or shape of the horse's ankle.

Since the brace 20 is preferably formed of neoprene rubber or some other good thermally insulative stretchable material it will effectively hold in the horse's body heat. This factor enables the brace of this invention to increase blood circulation through the affected body part (e.g., ankle and contiguous structure), thereby helping prevent stiffness and soreness by keeping the affected tissues warm and allowing for gradual cool-down. The use of neoprene or other similar materials to form the brace also allows for a quicker warm-up to avoid overstretching muscles and tendons and concomitant "micro-tears" in such tissue which could occur without an adequate warm-up. Another advantage of neoprene or other similar materials for the brace is that since such materials can stretch virtually omni-directionally, when the brace is wrapped about the horse's lower leg and ankle it will apply a uniform compression thereto. While neoprene is a particularly suitable material for the equine brace 20 of this invention, it must be reiterated, that other good thermally insulative, heat retaining, compression enhancing materials can be used in lieu of neoprene.

Figure 4:
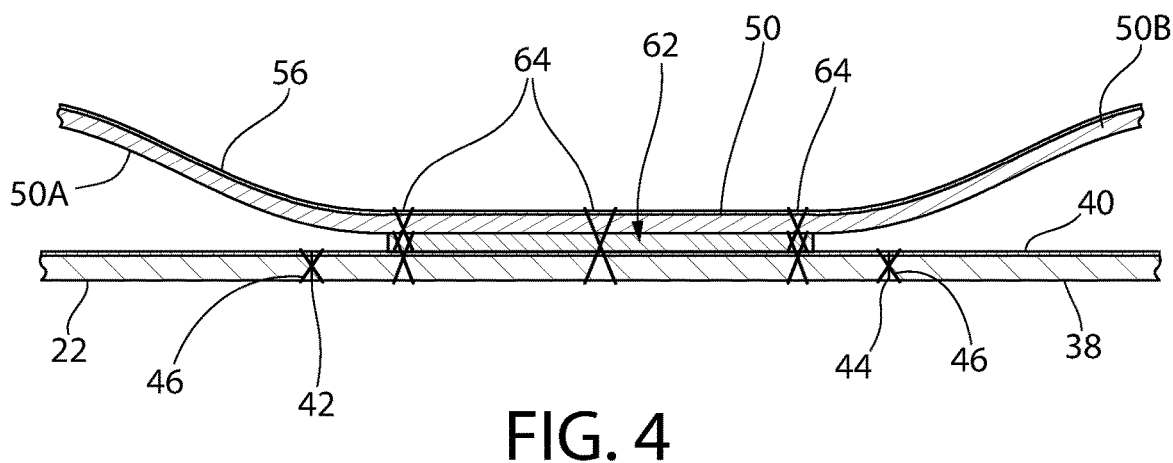
FIG. 4 is an enlarged sectional view taken along line 4-4 of FIG. 2.

As shown clearly in FIGS. 2-4 the panel 22 basically starts out as a generally rectangular shape having a top edge 30 a bottom edge 32, a pair of longitudinal side edges 34 and 36. The panel includes an inner surface 38 (FIGS. 3 and 4) and an outer surface 40 (FIGS. 2 and 4). The outer surface 40 of the panel 22 is in the form of a plush or multi-loop type fabric, like that of a VELCRO® fastening system or some other similar type fabric, that is fixedly secured (e.g., glued) to the underlying neoprene material layer. A pair of parallel darts 42 and 44 is cut in the panel 22 extending upward from the bottom edge 32. The cuts forming the darts and are stitched closed along respective stitch lines 46 and 48 respectively, to form the cup-shaped recess 24. The darts 42 and 44 are located laterally of the vertical midline of the panel and parallel thereto so that the cup-shaped pocket or recess 24 is located closer to the side edge 36 than to the side edge 34 (as noted earlier there is a "right" side brace system and a "left" side brace system).

Figure 5A:
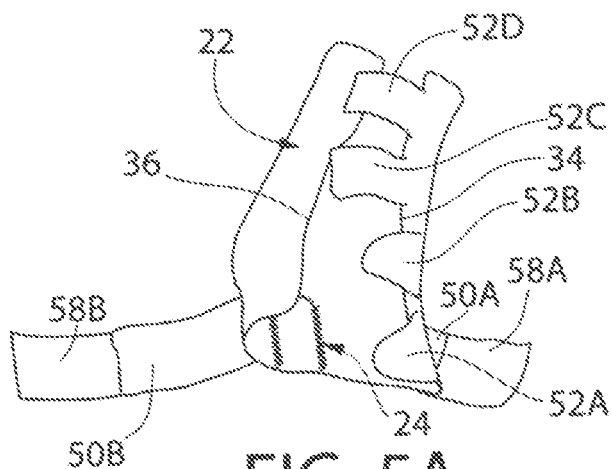
FIG. 5A-5F are respective illustrations showing the process of mounting the equine ankle brace of FIGS. 1A and 1B onto the lower leg and ankle of a horse.
Figure 5B:
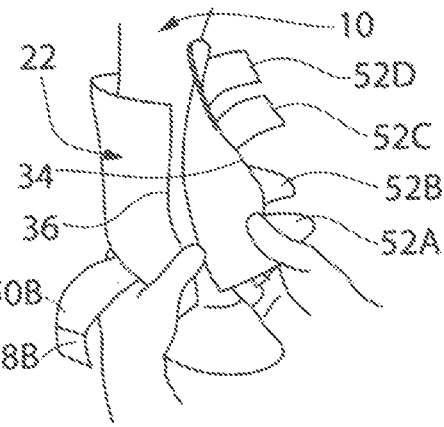
Figure 5C:
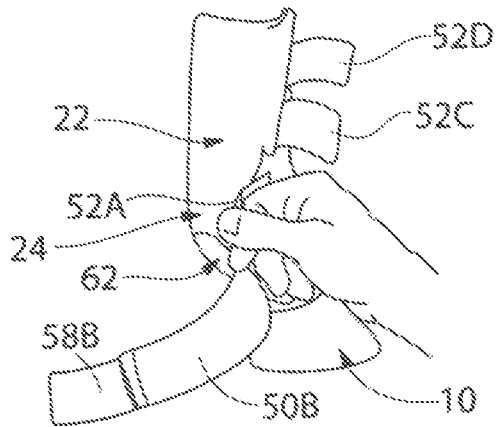
Figure 5D:
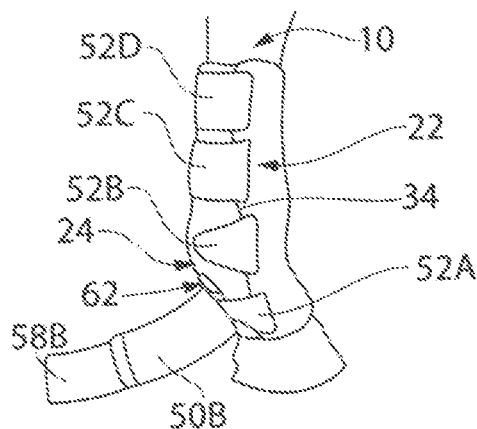
Figure 5E:
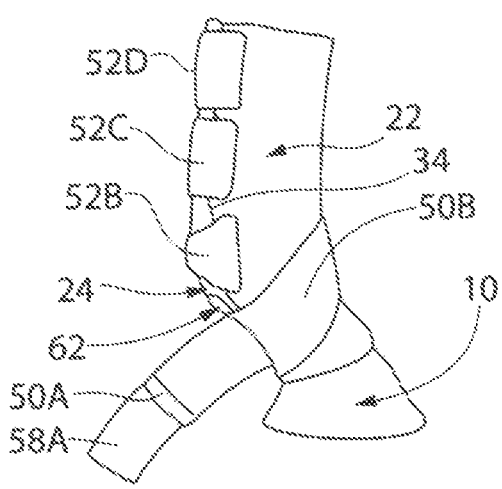
Figure 5F:
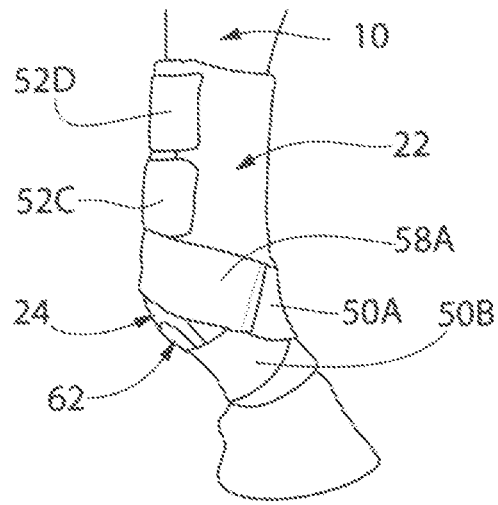

The panel 22 is arranged to be wrapped around the lower leg and ankle of the horse and releasably secured thereon so that the two longitudinal side edges 34 and 36 are oriented vertically and overlap slightly on the anterior (front) portion of the horse's ankle and lower leg, and with the posterior portion of the horse's fetlock joint located within the cup shaped recess 24 as shown in FIGS. 1A and 5F. The means for releasably securing the brace on the horse's lower leg constitutes releasable securable means 26 made up of a releasably securable fetlock support strap 50 and plural releasably securable fastening straps. In the exemplary embodiment shown there are four releasably securable fastening straps 52A, 52B, 52C and 52D.

The releasably securable fastening straps 52A and 52B are each in the form of a triangular shaped tab. The tabs are each fixedly secured, e.g., sewn by a respective stitch line 54, to the outer surface 40 of the panel 22 adjacent the longitudinal edge 34 so that the free end of each tab extends beyond the margin of the edge 34. The inner surface of each of the tabs 52A and 52B is in the form of a multitude of small hook-like projections like that of a VELCRO® fastening system or some other similar type fabric, and which are arranged to releasably engage the plush or multi-loop fabric outer surface 40 of the panel 22 contiguous with the opposite marginal edge 36. The outer surface of each of the tabs 52A and 52B is in the form of a plush or multi-loop fabric like that forming the outer surface of the panel 22. This feature enables portions of the releasably securable fetlock support strap 50 to be releasably secured to the outer surface of the tabs 52A and 52B and the contiguous outer surface 40 of the panel 22 when the brace is in its operative position or state. In accordance with the preferred embodiment of this invention, each of the tabs 52A and 52B is a VELCRO® die cut one-way wrap, but other similar multi-hook fasteners can be used.

The releasably securable fastening straps 52C and 52D are located on the panel 22 above the fastening straps 52A and 52B. Each of the fastening straps 52C and 52D is in the form of a rectangular shaped tab which is fixedly secured, e.g., sewn by a respective stitch line 54, to the outer surface 40 of the panel 22 adjacent the longitudinal edge 34 so that the free end of each tab 52C and 52D extends beyond the margin of the edge 34. The inner surface of each of the tabs 52C and 52D is in the form of a multitude of small hook-like projections like that of the tabs 52A and 52B to enable the tabs 52C and 52D to releasably engage the plush or multi-loop fabric outer surface 40 of the panel 22 contiguous with the opposite marginal edge 36 when the brace is in its operative position or state on the horse's lower leg. In accordance with the preferred embodiment of this invention, each of the tabs 52C and 52D is a VELCRO® multi-hook fastener, identified as "hook 88", but other but other similar multi-hook fasteners can be used.

The releasably securable fetlock support strap 50 basically comprises a single elongated web or strap of an elastic or stretchable material, whose outer surface 56 is in the form of a plush or multi-look fabric like that of the panel 22. In accordance with a preferred embodiment of this invention the fetlock support strap 50 is a VELCRO® VELSTRETCH® material, but other similar materials can be used. The fetlock support strap 50 is sewn at its midpoint to the heel of the panel 22 between the two darts 42 and 44 to form two fetlock support strap portions 50A and 50B which extend in opposite transverse directions from the cup-shaped recess or pocket 24. A tab 58A is fixedly secured, e.g., sewn by a stitch line 60, to the free end of strap portion 50A. In a similar manner, a tab 58B is fixedly secured, e.g., sewn by a sew line 60, to the free end of strap portion 50B. Each of the tabs 58A and 58B is similar in construction to the tabs 52C and 52D. Thus, the inner surface of each of the tabs 58A and 58B comprises a multitude of small hook-like projections.

The fetlock support strap portions 50A and 50B are arranged to be pulled and stretched in a cross-over or generally X-shaped configuration over the area contiguous with the brace's adjacent vertical edges 34 and 36 so that the multiple small hooks on the inner surface of the free distal end portion 58A and 58B engage the plush or multi-lop outer surface 40 of the brace adjacent the opposite vertical edge, from which the support strap portion extended to releasably secure the free ends of the fetlock support strap portions to the portions of the brace which they engage. Since the entire outer surface 40 of the panel 22 and the outer surface of the fastening tabs 52A and 52B is made up of the plush or multi-loop fabric, the multitude of hooks on the undersurface of the tabs 58A and 58B can be releasably secured at any place on the outer surface of the brace adjacent the posterior of the ankle below the fastening tabs 52C and 52D as shown in FIGS. 5E and 5F.

As will be appreciated by those skilled in the art, the overlapping strap portions 50A and 50B provide upward lift and support for the horse's fetlock joint which is located within the cup-shaped pocket or recess of the brace when the brace is in its operative position or state on the horse's leg. In addition, the overlapping securement of the fetlock support strap portions assure positive closure of the brace so that it is resistant to accidental opening even under wet, muddy or other adverse conditions. Nevertheless, the brace 20 of this invention can be readily removed by merely pulling the strap portions 58A and 58B off of the plush or multi-loop surfaces to which they are releasably secured and then pulling the fasting tabs 52A-52D off of the plush surface to which those tabs are releasably secured.

As mentioned earlier, the brace 22 is designed for use on either of the right side ankles of the horse or either of its left side ankles. Thus, the panel 22 forming the brace 20 is asymmetrical, i.e., the fetlock receiving recess or pocket 24 is located along a longitudinal axis which is laterally offset from the vertical midline of the panel. In order to identify which ankle, right or left, the brace 20 is designed to be used on, a tag (not shown) bearing some indicia, e.g., the letter "L" for left or "R" for right, is provided on the inner surface 38 of the panel. For example, each brace that is designed for use on a right ankle can bear a tag with the letter "R" on it. Similarly, each brace that is designed for use on a left ankle can bear a tag with the letter "L" on it.

In accordance with one of the main features of the brace 20 of this invention, a flexible stabilizing patch 62 is fixedly secured to the other surface 40 of the panel 22 centered in the region or area making up the cup-shaped recess or pocket 24. The flexible stabilizing patch 62 is formed of a flexible and abrasion resistant material, e.g., a leather-like material. Most preferably the material is leather itself. The manner of fixedly securing the patch to the outer surface of the panel is preferably by means of lines of stitches 64, but other fixed securement means, e.g., adhesives, can be used.

The fetlock support strap portion 50A is located on the portion of the brace that is to be located on the inside of the horse's leg when the brace is in place and thus serves as the "inside" fetlock support strap, while the fetlock support strap portion 50B is located on the portion of the brace that is to be located on the outside of the horse's leg when the brace is in place and thus serves as the "outside" fetlock support strap. In particular, when the brace is in its operative position on the horse's leg the wider side of the brace, i.e., the side from the vertical midline to the edge 34 is located on the inside of the horse's ankle and with the short side of the brace, i.e., the side from the vertical midline to the edge 36 being located on the outside of the ankle, and with the rear of the horse's fetlock joint being located within the cup-shaped recess or pocket 24. In that state the stabilizing patch 62 provides an area of controlled stretch of the resilient thermally insulating, heat-retaining material of the panel to provide additional stability at the flex point of the fetlock joint.

The placement of the brace 22 in the operative position on the horse's leg is accomplished as follows. The appropriate brace 22 (right side or left side) is selected depending upon which leg of the horse is to be braced. The fetlock support strap portions 50A and 50B are then folded back like shown in FIG. 5A such that their free ends are no longer releasably secured to the outer surface of the panel 22, whereupon the panel can be opened to accommodate the horse's lower leg. Thus, the brace is now ready for mounting on the horse's lower leg. To that end the lower curved portion of the brace with the cup-shaped recess or pocket 24 is placed on the leg of the horse with the rear of the horse's fetlock joint located within the recess or pocket and portions of the panel on either side of the pocket are pulled up from the bottom of the brace like shown in FIG. 5B. The bottom edge of the brace closest to the user is then held down while the user pulls firmly on the bottom tab 52A of the brace so that the two longitudinal side edges 34 and 36 overlap like shown in FIG. 5C. This procedure is repeated by the user working his/her way from the bottom tab 52A to the top tab 52D. Care should be taken to tuck under the lower edge pulling the top edge over securely and readjusting the tabs as necessary like shown in FIG. 5D. Once that has been accomplished the user pulls the outside fetlock support strap portion 50B at approximately a 45 degree angle across the front of the brace to bring the multi-hook inner surface of the free end portion of that strap into engagement with the plush outer or multi-loop outer surface 40 of the panel 22 to secure that strap to the inside of the leg like shown in FIG. 5E. In a similar manner the inside fetlock support strap 50A is pulled at approximately a 45 degree angle across the front of the brace and over the fetlock support strap portion 50B to bring the multi-hook inner surface of the free end portion of the strap portion 50A into engagement with the plush or multi-loop outer surface 40 of the panel 22 to secure the strap portion 50A to the outside of the leg like shown in FIG. 5F. This action results in the two fetlock support strap portions crossing over each other in a generally X-shaped configuration at the front of the horse's leg. If desired, the strap portion 50A and 50B can be adjusted to the level of support desired. This completes the mounting of the brace on the horse's leg, such that brace is in its operative position fitting snuggly on the horse's lower leg and ankle without any gaps as shown in FIGS. 1A, 1B and 5F.

It should be pointed out at this juncture that while not shown the brace 20 may, if desired, be configured for receipt of an insert like any of those disclosed in the aforementioned U.S. Pat. No. 5,871,458 (Detty). It should also be pointed out that the brace of the subject invention is designed to accommodate a wide range of sizes of ankles. However, the braces may have to come in some different sizes to accommodate all different sizes of horses' ankles. Depending on the specific anatomy of the ankle and contiguous leg portion, there may be some overlap (not shown) of the vertical marginal edges of the brace at the top of the brace.

By virtue of the cross-over or X-shaped strapping arrangement, a good secure closure system is provided, which is resistant to accidental disconnection. The portions of the fetlock support strap which lift and support the fetlock joint also serve to provide a customized fit to the needs of the horse and conditions by virtue of their adjustability. Moreover, by placing the locating and confining the stabilizing patch on the fetlock (ankle) part of the brace, the fetlock joint receives some added stability without impeding any movement. Thus, the material making up the stabilizing patch should not be of rigid construction so as to not cause harm to the joint. With the added stability, provided by the stabilizing patch, the brace 20 is able to achieve additional support in the fetlock area, almost acting like a re-enforcement to the fetlock support straps. That feature should enable a user to readily achieve independent, but equal pull from each fetlock support strap portion. In addition, the reinforcing patch helps the user to achieve a more accurate fit that ensures correct placement on the horse while still featuring/utilizing independent fetlock straps in a manner like that of the U.S. Pat. No. 5,871,458 (Detty) patent. Further still, since the fetlock area of the brace typically receives the most "abuse" during use, the reinforcing patch acts as an additional layer of protection against abrasive surfaces and protects that area of the horse from any sharp objects it comes in contact with. Thus, by default, the use of the reinforcing patch allows the brace to become a longer lasting product as well. That said, as should be appreciated by those skilled in the art, the addition of the reinforcing patch accomplishes more than mere surface protection, inasmuch as it's usage enable one to secure a tighter fit to the surrounding ligaments and tendons, as well as tightly compressing the sesamoid bones in the joint to keep them stable.

Without further elaboration the foregoing will so fully illustrate our invention that others may, by applying current or future knowledge, adopt the same for use under various conditions of service.

We claim:

1. An equine ankle brace configured to be wrapped about a fetlock and contiguous portion of a lower leg of a horse, the fetlock and contiguous portion of the lower leg of the horse having an anterior, a posterior, a fetlock joint having a rear portion, and sesamoid bones, said brace comprising:
   a panel formed of a resilient thermally insulating, heat retaining stretchable material having an inner surface, an outer surface, a first longitudinal edge, a second longitudinal edge, a top edge, a bottom edge, said panel being configured to be wrapped into an operative state around and closely conforming to the horse's fetlock and contiguous portions of the horse's lower leg to form a cup-shaped bottom portion located on the posterior of the horse's lower leg at the rear portion of the fetlock joint, whereupon the fetlock joint is located within the cup-shaped bottom portion and with portions of the panel contiguous with said first and second longitudinal edges overlapping each other in a first overlap area at the anterior of the horse's lower leg, said outer surface of said panel comprising a first releasably securable component of a fastening system;
   a flexible stabilizing patch formed of leather or a flexible material having less stretchability than said panel, said flexible stabilizing patch having a first side edge and a second side edge, said flexible stabilizing patch being fixedly secured as a layer onto said outer surface of said panel overlying said cup-shaped bottom portion at the rear portion of the fetlock joint when said panel is in said operative state and the rear portion of the horse's fetlock joint is within said cup-shaped bottom portion to provide said cup-shaped bottom portion with controlled stretch having less stretchability than portions of said panel outside said cup-shaped bottom portion, said cup-shaped bottom portion with said controlled stretch being confined to the rear portion of the fetlock joint at the posterior of the horse's lower leg to provide additional stability at a flex point of the fetlock joint; and
   a releasably securable fetlock support strap fixedly secured to said first side edge of said flexible stabilizing patch, to said second side edge of said flexible stabilizing patch and to said panel with said flexible stabilizing patch being interposed between said releasably securable fetlock support strap and said panel and fixedly secured thereto by a first line of stitches extending along said first side edge, a second line of stitches extending along said second side edge, and a third line of stiches extending along and between said first line of stiches and said second line of stiches, whereupon said releasably securable fetlock support strap is fixedly secured to said flexible stabilizing patch by said first, second and third line of stiches, said releasably securable fetlock support strap comprising a first free end portion and a second free end portion, said first free end portion projecting outward from said first side edge of said flexible stabilizing patch, said second free end portion projecting outward from said second side edge of said flexible stabilizing patch, each of said free end portions being formed of a resilient thermally insulating material and terminating in a free end including a second releasably securable component of said fastener system, said second releasably securable components of said free end portions being configured to be pulled into engagement with respective portions of said first releasably securable component of said panel to releasably secure said free ends to said respective portions of said first releasably securable component of said panel, whereupon portions of said releasably securable fetlock support strap adjacent said free ends overlap each other in a generally X-shaped configuration in a second overlap area on the anterior of the horse's lower leg opposite said flexible stabilizing patch, with said free ends being located on opposite sides of said second overlap area at the posterior of the horse's lower leg when in said operative state to cause the flexible stabilizing patch and portions of said panel contiguous therewith to tightly compress the sesamoid bones and keep them stable.

2. The equine ankle brace of claim 1 wherein said flexible stabilizing patch includes a bottom edge and a top edge, wherein said bottom edge of said flexible stabilizing patch is spaced above said bottom edge of said panel by a first distance and said top edge of said flexible stabilizing patch is spaced below said top edge of said panel by a second distance which is greater than said first distance, and wherein said longitudinal edges are configured to be brought proximate each other when said panel is wrapped about the fetlock and contiguous portion of the lower leg of the horse in said operative state, and wherein said equine ankle brace additionally comprises plural fastening straps fixedly secured to said panel adjacent one of said longitudinal edges, each of said plural fastening straps including a free end including a third releasably securable component of said fastener system configured to be pulled into engagement with other respective portions of said first releasably securable component of said panel to releasably secure said free ends of said plural fastening straps to said other respective portions of said first releasably securable component of said panel.

3. The equine ankle brace of claim 1 wherein said thermally insulating, heat retaining material comprises neoprene rubber.

4. The equine ankle brace of claim 2 wherein said thermally insulating, heat retaining material comprises neoprene rubber.

5. The equine ankle brace of claim 3 and wherein said first releasably securable component of said fastening system comprises a plush or multi-loop material, and wherein said second releasably securable component of said fastening system comprises a multi-hook loop material.

6. The equine ankle brace of claim 4 and wherein said first releasably securable component of said fastening system comprises a plush multi-loop material, and wherein said second releasably securable component of said fastening system comprises a multi-hook loop material.

7. The equine ankle brace of claim 1 wherein said flexible stabilizing patch is sewn onto said outer surface of said panel.

8. The equine ankle brace of claim 2 wherein said flexible stabilizing patch is sewn onto said outer surface of said panel.

9. The equine ankle brace of claim 3 wherein said flexible stabilizing patch is sewn onto said outer surface of said panel.

10. The equine ankle brace of claim 1 wherein said releasably securable fetlock support strap is sewn onto said flexible stabilizing patch.

11. The equine ankle brace of claim 7 wherein said releasably securable fetlock support strap is sewn onto said flexible stabilizing patch.

12. The equine ankle brace of claim 8 wherein said releasably securable fetlock support strap is sewn onto said flexible stabilizing patch.

13. The equine ankle brace of claim 9 wherein said releasably securable fetlock support strap is sewn onto said flexible stabilizing patch.

* * * * *